United States Patent
Prevorsek et al.

[11] 3,893,331
[45] July 8, 1975

[54] METHOD AND APPARATUS FOR DETERMINING SIDEWALL TEMPERATURE IN RUNNING TIRES

[75] Inventors: Dusan Ciril Prevorsek; Young Doo Kwon, both of Morristown; Russell Howard Butler, Dover; Raj Kumar Sharma, Morristown, all of N.J.

[73] Assignee: Allied Chemical Corporation, New York, N.Y.

[22] Filed: Apr. 26, 1973

[21] Appl. No.: 354,566

[52] U.S. Cl. ............... 73/15.6; 73/339; 73/340
[51] Int. Cl. ................................. G01k 3/06
[58] Field of Search ........ 73/340, 339, 15.4, 15.6, 73/89, 160

[56] References Cited
UNITED STATES PATENTS
1,558,594  10/1925  Coffin ............................ 73/89

OTHER PUBLICATIONS
"Cord Stresses in Inflated Tires" in Textile Research Journal by Lauterbach et al; pages 890–900, Nov. 1959.
"A Tirecord Tension Transducer" in Textile Research Journal by Walter; pages 191–196, Feb. 1969.
"Hysteresis and Related Properties of Tire Cords" by Wakeham et al., in Journal of Applied Physics, page 698–711, Volume 17, August 1946.
"A Comparison of Some Elastic Properties of Tire Cords" by Wakeham et al., in Journal of Applied Physics, pages 388–401, Volume 16, July 1945.

Primary Examiner—S. Clement Swisher
Assistant Examiner—Denis E. Corr
Attorney, Agent, or Firm—Robert A. Harman

[57] ABSTRACT

By measurement of sidewall temperatures generated by a tire rotating under load, and especially the sidewall surface temperature at an equilibrium state, and by hysteresis measurements on the cord used for reinforcing the tire, temperature profiles through the sidewall can be determined; and from such determination on a given tire, the sidewall temperature profile through a tire of like construction but employing different reinforcing cords can be estimated. An improved apparatus for hysteresis measurement on a strand is used.

4 Claims, 3 Drawing Figures

DISCRETIZED POSITION COORDINATE SYSTEM FOR THE NUMERICAL SOLUTION OF TIRE SELF-HEATING EQUATION.

METHOD AND APPARATUS FOR DETERMINING SIDEWALL TEMPERATURE IN RUNNING TIRES

BACKGROUND OF THE INVENTION

This invention relates to determining the temperature profile through the sidewall of a running tire. The determination is based upon measurement of surface temperature of such running tire without necessarily inserting thermocouples or like temperature measuring devices into the tire sidewall itself. Moreover, the invention provides a method of estimating such temperature profile through the sidewall, which can be expected using selected cords in a given construction, by measurements on the tire cord without actually building the specific tire.

Some study has been given in the prior art to the heat generation in tires due to the elastic hysteresis of the cord fabric. See Wakeham et al. in *Journal of Applied Physics*, Vol. 17 of August, 1946, article beginning page 698. This prior study concluded, "Tire heat build-up is determined by so many additional factors involved in tire structure and rubber composition that the part contributed by the cord can only be estimated." (page 711, top of column 1).

SUMMARY OF THE INVENTION

This invention starts with selection of an area of a running tire for temperature measurement, in which relatively simple conditions of heat flow are found to predominate, viz., only outward and along the shortest path; and in which the temperatures generated are found to be significant with respect to tire failure. This area is at the sidewall of the tire. The invention further involves determining the stress on the cord in the cord-reinforced region of the sidewall when the tire is inflated and under no load; determining the surface temperatures at the sidewall of such tire while running under load until a constant sidewall surface temperature is reached; and determining by precision hysteresis measurements on samples of the tire cord, and by a process of correlation of these with measured surface temperatures, the rate of heat generation due to the cord in the reinforced region of the sidewall under running conditions. In the hysteresis measurements the cord sample is maintained at average stress equal to that determined for the sidewall cords of the inflated tire under no load; and at a strain amplitude maintained constant throughout the test, and selected via the correlation of heat generation rate/surface temperatures to yield the experimentally measured surface temperature. The invention provides, additionally, an improved apparatus for the necessary hysteresis measurement, described in more detail below; and can be applied to predict sidewall temperatures in a tire of like construction to a tire which has been tested by the invention, but built using cords having different properties from those of the tested tire.

DRAWINGS

FIG. 1 diagrammatically illustrates tire construction through the sidewall. The reinforced region extends from $X=0$ to $X=L_m$ and the outer rubber layer extends from $X=L_m$ to $X=L$. These regions are subdivided into intervals each of thickness $(\Delta X)$ and numbered in the reinforced region as $i$ from $i=1$ to $i=m$, and then continuing in the outer rubber layer from $i=m+1$ to $i=N$.

FIG. 2 diagrammatically illustrates apparatus suitably employed to measure the elastic hysteresis of the sidewall cord. The apparatus includes as its principal elements an oven 1 in which the sample is horizontally supported; an eccentric 2 connected to one end of the sample; an electronic cell 3 responsive to tension forces, connected to the other end of the sample, the distance between the connectors being adjustable; a motor 4 causing rotation of the eccentric to apply cyclic stress and strain to the sample; and a second electronic cell 5 connected through a spring 6 to the eccentric whereby the stress applied to the spring is sensed by cell 5 and is proportional to the strain applied to the sample.

FIG. 3 illustrates a typical stress/strain hysteresis loop generated by operation of the apparatus of FIG. 2, as observed by feeding the output from cells 3 and 5 to a conventional oscilloscope (not shown).

DETAILED DESCRIPTION

Figure 1:
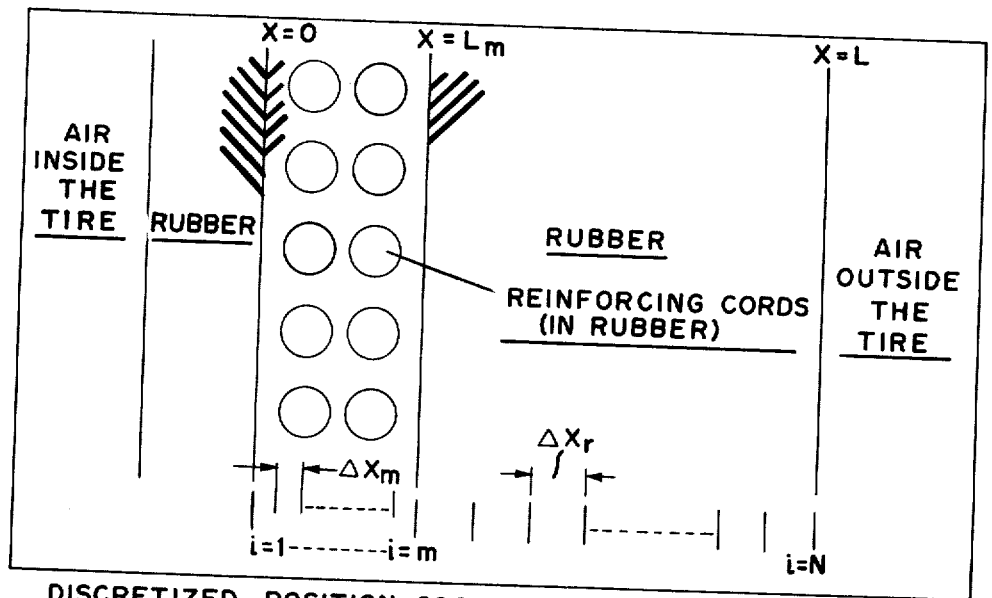

The carrying out of our invention involves the following steps:

1. Determining the stress on the cords in the reinforced region of the sidewall of an inflated tire when under no load;
2. Determining, in the given tire sidewall, the following physical properties:
   Specific heat of cord $(C_c)$
   Specific heat of rubber $(C_r)$
   Density of cord $(D_c)$
   Density of rubber $(D_r)$
   Surface heat transfer coefficient from rubber to air $(h)$
   Thermal conductivity of cord $(K_c)$
   Thermal conductivity of rubber $(K_r)$;
3. Determining, in the given tire sidewall, the following parameters of construction (see FIG. 1):
   Thickness of the reinforced region $(L_m)$
   Thickness of the outer rubber layer $(L_r)$
   Volume fraction of cord in the reinforced region $(V)$;
4. Running such tire at constant rate of revolution while maintaining given ambient temperature and under at least one given load;
5. While so running the tire, measuring the surface temperatures at the sidewall after each new load is imposed, until the surface temperature reaches a constant value;
6. Determining values at various temperatures for rate of heat generation $(Q)$ in the tire sidewall per unit volume of cords, by subjecting cords representative of those in said sidewall to hysteresis measurements at average stress maintained equal to that determined under no load per step 1 above; and at cycling rate (i.e., stress cycle frequency) equal to the rate of revolution imposed on the tire in step 4 above; and at a series of temperatures; and at various strain amplitudes; and measuring the area within the observed hysteresis loop to evaluate heat generation rates from these cords under the given conditions;
7. Solving by computer the relation below between temperature $T$ and the rate of heat generation $Q$ at successive times $t$ and at successive points $x$ through the tire sidewall from the inside, through the reinforced region, through the outer rubber layer, to the outside surface point where surface temperature $T_s$ was measured, viz.: $DC(\delta T/\delta t)=K(\delta^2 T/\delta x^2) + QV$; wherein the symbols $D, C, K, Q, V$ have the appropriate meanings indicated in steps 2, 3 and 6 above with $D_m$ for the reinforced region given by: $D_m=D_cV+D_r(1-V)$; $K_m$ for said region given by: $K_m=K_cV+K_r(1-V)$; and $C_m$ for said region given by: $C_m=C_cW+C_r(1-W)$, where $W=D_cV/[D_cV+D_r(1-V)]$; and the initial conditions are taken as $T(x,0)=T_a$, where $T_a$ is the ambient temperature; and the boundary conditions are taken as: At $x=0$, $(\delta T/\delta x)=0$, where $x=0$ is at the inner boundary of the reinforced region as shown in FIG. 1; and at $x=L_m, K_m(\delta T/\delta x)=K_r(\delta T/\delta x)$, where $L_m$ is at the outer boundary of the reinforced region and $K_m$ is thermal conductivity of the reinforced region, i.e., $K_m=K_cV+K_r(1-V)$; and at $x=L, -K_r(\delta T/\delta x)=h(T-T_a)$, where $L$ is at the outer surface of the sidewall, $h$ is the surface heat transfer coefficient of rubber to air, and $T_a$ is the ambient air temperature; and 8. Determining corrected values of $Q$, preferably as a function of "effective" strain amplitude and $T$, suitably by an iterated process, on the computer, of relating experimental values of $Q$ and strain amplitudes at various temperatures, and substituting these $Q$'s from the computer memory into the expression for temperatures of step 7 to obtain matching of $T_N$ with the experimentally determined values of surface temperatures $T_s$; whereupon the resulting values of $T$ at successive points $x$ within the sidewall and at successive times represent the temperature profile through the sidewall at each time.

A further aspect of our invention allows estimating temperatures at the sidewall surface and through the sidewall of an inflated pneumatic tire of known construction built using previously untested cords, and running under specified load. For this purpose one determines by the method above outlined, effective strain amplitudes in a standard tire of the given construction, running at specified load and rate; then utilizes said effective strain amplitudes in the procedure of step 6 above to determine values, at the temperatures found above to develop in the standard tire, for rate of heat generation in the sidewall of the untested tire upon cords representative of those to be used in said sidewall; and then solves by computer the relation between $T$ and $Q$ set forth in above step 7; whereupon the resulting value of $T$ at a given time and at a given point $x$ within the sidewall provides an estimate of the temperature to be expected at that time and at that point under the given conditions of inflation pressure, load, and rate of revolution of the tire.

Figure 2:
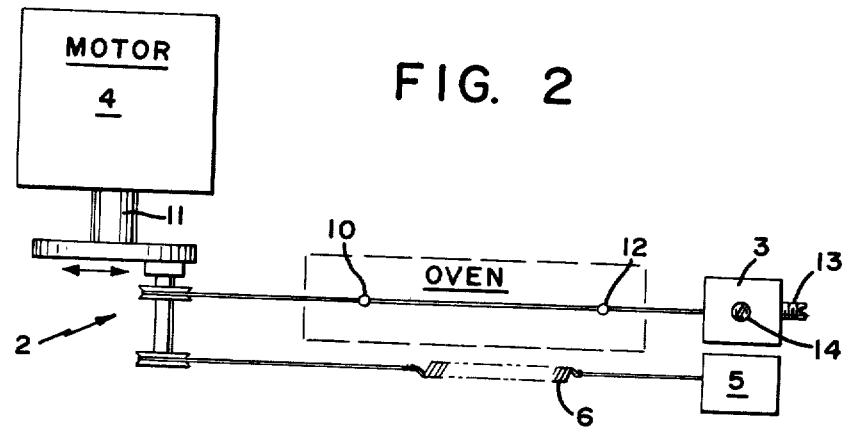

A further aspect of the invention is improved apparatus for determining elastic hysteresis of a strand at various temperatures. In our apparatus as diagrammed in FIG. 2 of the drawings, the strand is horizontally supported in an oven 1 and is connected by a hook 10 or the like at one end to the eccentric 2 rotating about an axis such as the axis of drive shaft 11, and at the other end the strand is connected by hook 12 to electronic cell 3 responsive to tension forces applied thereto; the distance between the connections 10 and 12 being adjustable as by means of a precision set screw represented at 13. Said eccentric is additionally connected elastically, as by extensible spring 6 to a second electronic cell 5 responsive to tension forces applied thereto via the elastic connection. The output from the first cell, to which the strand is connected, is employed to produce an instantaneous record of the stresses cyclically imposed on the strand and also to produce a record of the average level of these stresses. The output from the second cell is employed to produce an instantaneous record of the strains cyclically imposed on said strand. In our improvement, the connector 12 for the strand at the cell end is mounted both for precise horizontal adjustment as by a screw 13 and for precise vertical adjustment as by a screw represented at 14; whereby the axis of the rotation of the eccentric around shaft 11, and the longitudinal axis of the strand between hooks 10 and 12 and the longitudinal axis of the elastic connector (spring 6) from the eccentric to the second cell can be brought all into the same plane (at the reversal points of the strand extension); and moreover the strand axis and elastic connector axis are set perpendicular to the axis of the rotation of the eccentric. Desirably both the strand and the elastic connector at their cell ends are mounted for precision transverse adjustment to allow setting the axis of each perpendicular to the axis of the rotation of the eccentric with high accuracy. All the above settings are desirably accurate to ±5 inches of angle.

Individual steps of our method will now be described in their preferred embodiments.

Step 1. Determining the stress on the cords in the reinforced region of the sidewall of an inflated tire when under no load. The stress can be determined directly by implanting a tension transducer into the region desired for study. (See article by J. D. Walter in Textile Research Journal of February 1969 at page 191).

To avoid the disturbing effects on the results, due to a transducer implanted in a rotating tire, the cord stress can be calculated in accordance with article by Lauterbach and Ames in Textile Research Journal of November 1959 at page 890. This calculation requires knowledge of the so-called green cord angle, $\alpha$, as seen in equation 21 of the article, and of the cord extension ratio $C_t$. The angle $\alpha$ can be calculated from the final cord angle in the cured tire, $\beta$, between the cord and the circumference of the tire, $\beta$ being measured experimentally. The formula for such calculation is;

$$\alpha = \text{arc cot } [(L_2/L_1) \cot \beta]$$

where $L_1$=length of meridional arc around the tire from one bead, up the sidewall, over the crown, and down to the opposite bead; and $L_2$=straight line distance transverse of the tire carcass from bead-to-bead.

The value for $C_t$ can be found as indicated by the Lauterbach article (at page 894, column 1) by iterated computation on $C_t$ until a reasonable fit to the actually measured contour of the entire carcass is obtained.

Step 2. The properties in the tire sidewall for cord and rubber, needed for the stress calculation and for subsequent steps, are obtained by standard methods; namely the densities, the specific heats, the surface heat transfer coefficient from rubber to air, and the thermal conductivities.

The required tire construction parameters for step 3 above, namely, thickness of the reinforced region and of the rubber layer and volume fraction of the cords in the reinforced region, can be obtained by knowledge of how the tire was constructed, or by cutting radially into a tire of the given construction and making the required measurements, e.g., photographically.

The running of the tire in our step 4 is carried out by standard known methods of tire testing, upon a tire driven by a revolving drum. The measurements of sidewall temperature (our step 5) upon such running tire can be made by use of thermocouples or by observing the sidewall with an infrared radiation detector capable of determining wavelengths, from which the corresponding temperature is derivable by well-known methods.

Step 6. Determining values at various temperatures for rate of heat generation $Q$ per unit volume of cords in the tire sidewall. The apparatus utilized is diagrammatically illustrated in FIG. 2. The principal parts of the apparatus and their functions have been identified above.

More particularly, the oven 1 is constructed generally along the lines of that described by Wakeham et al. in *Journal of Applied Physics*, Vol. 16 of July, 1945 in article beginning at page 388, in particular at pages 391–392.

For recording average stresses on the strand, conveniently a meter is connected to the output of the first electronic cell 3 which meter is slow enough in response to give an average reading of the tensions or stresses cyclically applied to this first cell. For recording the instantaneous cyclic stresses applied to the strand, an oscilloscope is connected to the output from the first cell. The cyclic stresses applied through the strand to the first cell determine the vertical coordinates of the stress-strain curve displayed on the oscilloscope; and the cyclic stresses applied to the second cell 5 through the spring 6 determine the horizontal coordinates corresponding to cyclic stresses applied through the spring 6. Because tension in a spring is proportional to its elongation, these horizontal coordinates represent the strains imposed on the spring by the motion of the eccentric 2.

Figure 3:
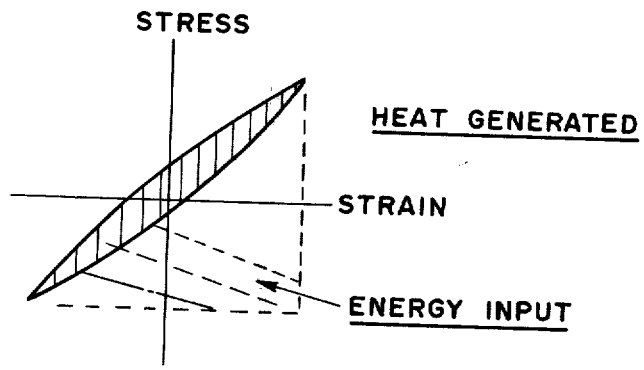

The resulting stress-strain curves displayed on the oscilloscope screen give a representation, diagrammed in FIG. 3 of the drawings, of the time variation of stress vs. strain in a strand or cord being tested in the subject apparatus, wherein the area under the upper curve is proportional to the energy expended for stretching the strand and the area under the lower curve is proportional to the work recoverable upon contraction of the strand, the area enclosed between the curves being proportional to $Q^1$, the heat generated in each cycle of stretching the strand and then allowing it to contract, at the strain amplitude set by the minimum vs. maximum separation of the strand supports (hooks) 10 and 12.

During the testing of a tire cord such as nylon and polyester cords, the tensile modulus of the cord gradually changes, as also happens in a running tire. Accordingly, the separation between the supports 10 and 12 must be periodically readjusted during the testing in order to maintain at desired value the average stress on the cord being tested, this stress value being the stress on the cords when the tire is inflated and under no load, as determined in accordance with step 1 of our process. Moreover, it is necessary, for obtaining reliable results, to check periodically the alignment of the motor shaft 11, the cord under test, and the spring 6 which should be as previously described, within ±5 inches of angle. This can be done mechanically but is more conveniently done by reversing the motor and checking to see that the resulting hysteresis curve duplicates that being generated when the motor runs forward. If not, a corrective adjustment of the vertical and/or transverse position of hook 12 is called for. The curves displayed on the oscilloscope are conveniently recorded by photographing.

Step 7. Solving by computer the relation between $T$ and $Q$ above set out, viz., $DC(\delta T/\delta t) = K(\delta^2 T/\delta x^2) + QV$ for the stated initial and boundary conditions. The quantity $(\delta T/\delta t)$ is approximated as:

$(\delta T/\delta t) \approx (T - T^*)/\Delta t$ where $T$ is temperature at a given point in the running tire sidewall as measured at a specified time, and $T^*$ is temperature at the same point, at the next preceding time of measurement, each time interval between measurements being $\Delta t$.

Also $(\delta^2 T/\delta x^2) \approx (T_{i+1} - 2T_i + T_{i-1})/(\Delta x)^2$ where $i-1$, $i$, $i+1$ designate successive points at intervals of thickness through the tire sidewall and $(\Delta x_m)$, $(\Delta x_r)$ are the thicknesses of each such interval in the reinforced zone and in the rubber layer, respectively, as diagrammed in FIG. 1 of the drawings. Tests by the procedure of Step 6 above show that the heat generation rate $Q_r$ due to rubber hysteresis is usually small compared to cord hysteresis effects and may under such conditions be neglected.

Accordingly, at points through the sidewall, other than boundaries of the reinforced region or of the outer rubber layer, the relations of Step 7 for computer solution are:

A. In the reinforced region, at point $i$, $D_m C_m (T_i - T_i^*)/\Delta t = K_m [T_{(i+1)} - 2T_i + T_{(i-1)}]/(\Delta x_m)^2 + Q_i V_i$. To take account of rubber hysteresis, a term $Q_{ri}(1-V_i)$ will be added at the right.

B. In the outer rubber layer, at point $j$, $D_r C_r (T_j - T_j^*)/\Delta t = K_r [T_{(j+1)} - 2T_j + T_{(j-1)}]/(\Delta x_r)^2$. To take account of rubber hysteresis, a term $Q_{rj}$ will be added at the right.

C. At all points, the initial conditions when $t=0$ are: $T_{(t=0)} = T_{(t=1)} = T_{(t=m)} = T_{(t=N)} = T_a$, where $T_a$ is the ambient air temperature;

D. At the inner boundary of the reinforced region, where $i=1$, the boundary conditions above set out for Step 7 result in the approximate relation:
$D_m C_m (T_1 - T_1^*)/(\Delta t) + 2 K_m T_1/(\Delta x)^2 = 2K_m T_2/(\Delta x)^2 Q_1 V_1$;

A term $Q_{r1}(1-V_1)$ will be added at the right to take account of rubber hysteresis.

E. At the outer boundary of the reinforced region, where $i=m$, the boundary conditions result in the approximate relation:
$K_m [T_{(m)} - T_{(m-1)}]/\Delta x = K_r [T_{(m+1)} - T_m]\Delta x$; and F. At the outer surface of the tire sidewall, where $i=N$, the boundary conditions result in the approximate relation:
$-K_r [T_N - T_{(N-1)}]/\Delta x = h(T_N - T_a)$, where $T_N$ is to match $T_S$, temperature measured at the sidewall surface, and $T_a$ is the ambient air temperature.

Accordingly, at the first time of temperature calculation there are N linear equations in $N$ variables $T_1, T_2 \ldots T_N$ and in known values for $(T_i^*)$, namely, the initial temperatures at all points $(=T_a)$ and in experimental values for $Q_i$. Solution of these equations gives the $T$'s at successive points, for use as $T^*$'s in the corresponding set of equations derived from the second temperature calculation, and gives a calculated $T_N$ at this first time; and so on for each successive choice of time.

Step 8. The determination of the $T_N$'s is repeated with use of corrected values for $Q_i$'s, e.g., as calculated from chosen trial values of strain amplitude, until the resulting values of $T_N$ correspond satisfactorily to the experimentally measured surface temperatures. Such procedure is exemplified below.

Using the "effective" value for the strain amplitude, i.e., a trial value which yields satisfactory agreement between calculated and experimentally determined tire temperature, the procedure of our invention (Steps 6 and 7) can be applied to determine temperatures which will develop in the sidewall of an untested tire of like construction to that of the tested tire, when in the untested tire, the reinforcing cords have different properties from those in the like constructed standard tire.

EXAMPLES

Three polyester bias-belted tires all of the same construction were produced using in each a different type of commercially available PET reinforcing cord.

The cord stress under no load in the sidewalls of these tires was determined by the Lauterbach procedure above referred to (*Textile Research Journal* of November, 1959, pages 890–896) at inflation pressure of 24 p.s.i.g. using the following measured values of the tire construction parameters:

| | |
|---|---|
| Maximum tire radius (center of rotation to crown) | $r_a = 13.783''$ |
| Minimum tire radius (center of rotation to bead) | $r_s = 7.375''$ |
| Distance of widest section of tire from center of rotation | $y_B = 10.70''$ |
| Cord angle with circumference | beta = 29° |
| Cords per unit length | n = 24.01 |
| Length (meridional) from one bead around the sidewall, over the crown, and down to opposite bead | $L_1 = 18.66''$ |
| Distance between beads | $L_2 = 6.02''$ |

The values of the (y,z) coordinates (Lauterbach FIG. 3) at the points of interest were measured with reference to a rectangular framework of known dimensions set up around the tire. The corresponding values of green cord angle (alpha) and initial end count in green ply ($n_o$) are calculated by: $\alpha = \text{arc cot} [(L_2/L_1) \cot \beta]$ and $n_o = (y/r_s)n \sin \beta/\sin \alpha$; whence $\alpha = 59.78$, $n_o = 25.18$. Cord extension ratio ($c_t$) is determined by iteration (Lauterbach, page 894, col. 1). The resulting values for $c_t$ and $f(y)$ of Lauterbach eq. (1) and $F_N$ of Lauterbach eq. 21, and the cord stresses in these tires at the points of interest are shown in Table I below:

TABLE I $C_t = 1.41428$

| y(inches) | f(y) | Meridional Cord Stresses $F_{N}$ (pounds) |
|---|---|---|
| 13.720 | 4.9807 | 3.7522 |
| 13.656 | 3.4647 | 3.7254 |
| 13.593 | 2.7818 | 3.6990 |
| 13.529 | 2.3679 | 3.6732 |
| 13.149 | 1.3368 | 3.5278 |
| 13.022 | 1.1697 | 3.4827 |
| 12.260 | 0.5967 | 3.2425 |
| 11.309 | 0.2032 | 3.0014 |
| 10.167 | −0.1747 | 2.7756 |
| 9.025 | −0.6214 | 2.6008 |
| 8.4536 | −.9719 | 2.5283 |

Physical properties for the tire material are shown in Table II below.

TABLE II

PHYSICAL PROPERTIES OF TIRE MATERIAL

| Symbol | Description | Values |
|---|---|---|
| $D_c$ | Density of cord material | 1.39 gm/cc |
| $D_r$ | Density of rubber | 0.913 gm/cc |
| $C_c$ | Specific heat capacity of cord | 0.343 cal/gm-°C |
| $C_r$ | Specific heat capacity of rubber | 0.449 cal/gm-°C |
| $K_c$ | Thermal conductivity of cord | 3.36×10⁻⁴ cal/cm-sec-°C |
| $K_r$ | Thermal conductivity of rubber | 9×10⁻⁴ cal/cm-sec-°C |
| $L_m$ | Thickness of composite zone | 0.1 cm |
| $(L-L_m)$ | Thickness of outer rubber layer | 0.35 cm |
| $V_c$ | Cord vol. frc. in composite | 0.25 |
| h | Surface heat transfer coefficient, rubber to air | 1.5×10⁻³ cal/cm²-sec-°C |

REINFORCED COMPOSITE PROPERTIES

| | |
|---|---|
| $D_m = V_c D_c + (1-V_c)D_r$ | = 1.03 gm/cc |
| $C_m = W_c C_c + (1-W_c)C_r$ | = 0.413 cal/gm-°C |
| Where $W_c = V_c D_c/[V_c D_c + (1-V_c)D_r]$ | = 0.337 |
| $K_m = V_c K_c + (1-V_c)K_r$ | = 7.59×10⁻⁴ cal/cm-sec-°C |

Subscripts:
c = cord; r = rubber; m = reinforced composite.

The heat generation rates per unit volume for one of the three types of cords (dipped in latex and tensilized by a conventional test procedure for cords being tested for tire reinforcement) were determined at various temperatures from 40°C. up to 150°C. and at various strain amplitudes in the apparatus above described. Constant average stress on the cords was maintained at the value of 3.00 pounds, corresponding to calculated stress at the value of y where sidewall temperatures were measured (about 11.3 inches, as seen in Table I). Results of these heat generation rates per unit cord volume Q are listed in Table III below, at the strain amplitudes and temperatures shown in the Table.

"Effective" strain amplitudes are determined as follows and are used to derive corrected values of Q in Step 8 above.

TABLE III

HEAT GENERATION RATE (erg/cc-sec) vs. TEMPERATURE AT VARIOUS STRAIN AMPLITUDES (UNDER AVERAGE STRESS OF 3.0 LBS.)

| Temperature °C. | STRAIN AMPLITUDES | | | |
|---|---|---|---|---|
| | 0.53% | 0.82% | 1.07% | 1.37% |
| 40 | 0.95×10⁶ | 3.30×10⁶ | 6.52×10⁶ | 13.00×10⁶ |
| 50 | 0.90 | 3.10 | 6.50 | 13.20 |
| 60 | 0.90 | 2.90 | 6.60 | 13.40 |
| 75 | 0.96 | 2.74 | 7.03 | 13.95 |
| 90 | 1.00 | 3.00 | 7.95 | 14.85 |
| 105 | 1.00 | 3.25 | 8.70 | 15.40 |
| 120 | 1.10 | 3.76 | 9.40 | 15.00 |
| 135 | 1.24 | 3.90 | 8.40 | 13.45 |
| 150 | 1.26 | 3.64 | 7.12 | 11.50 |

Determination of Effective Strain Amplitudes

The first step involves the determination of Q as a function of temperature T and strain amplitude ε using the heat generation rate data obtained at various temperatures and strain (see Table III). This can be achieved by a polynomial regression, as follows:

Data, such as those of Table III, are graphed and the temperature scale is divided into temperature intervals such that all values of Q between two adjacent temperatures can be approximated by a straight line. At any of these $n$ selected temperatures using the experimental values of strain amplitudes, a polynomial regression of the following form can be carried out:

$$Q = A_1 + A_2 \epsilon + A_3 \epsilon^2 + A_4 \epsilon^3$$

Thus, one can obtain $n$ sets of $A_1, A_2, A_3, A_4$. For a given temperature and a trial value of strain amplitude, a corrected $Q$ is calculated as follows:

1. Determine the two experimentally tested temperatures between which the given temperature is located.
2. Calculate $Q$ for the trial value of strain amplitude $\epsilon$ at each of these two temperatures, using the appropriate two sets of $A_1, A_2, A_3, A_4$.
3. Find the $Q$ corresponding to the given temperature by linearinterpolation between the two calculated values of $Q$.

In a typical calculation for $Q$ at 50°C. and at a trial strain amplitude of 0.65%, one might find that, for the two temperatures 40° and 60°C., the following values of coefficient, $A_1, A_2, A_3$ and $A_4$, would satisfactorily approximate the experimental values of $Q$ at these temperatures and at a series of experimental values for strain amplitudes, such as those of Table III:

|  | $A_1$ | $A_2$ | $A_3$ | $A_4$ |
|---|---|---|---|---|
| 40°C. | 0.677×10⁻³ | 0.941 | −0.824 | 1.44 |
| 60°C. | 0.619×10⁻² | 0.376 | 0.520 | 0.728 |

The corresponding values of $Q$ calculated by the above polynomial, for a strain amplitude of 0.65% are 0.65998 at 40°C., and 0.67000 at 60°C. (in cal/cm-sec).

Then by linear interpolation the value of $Q$ at 50°C. and a strain amplitude of 0.65% is (0.65998) + (0.67000-0.65998)/60-40 × (50-40) = 0.65998 + 0.00501 = 0.66499 cal/cm-sec.

4. The "effective" strain amplitude is then determined by varying the trial value of strain amplitude and thus deriving corrected $Q$ values, until the calculated temperatures, calculated in accordance with Step 7 above, match the measured temperatures; e.g., calculated sidewall surface temperature, $T_N$, matches measured sidewall surface temperature $T_S$; and at the same time, the "given" temperature used in finding the final corrected $Q$ value checks with the temperature of the reinforced region as yielded by the procedure of Step 7 above when using this corrected $Q$ value.

The heat generation rates per unit volume of the cured rubber stock from these tires at various elongations and temperatures were determined in the previously described apparatus as for the cords; the results are shown below in Table IV.

TABLE IV

RUBBER STOCK
HEAT GENERATION RATE (erg/cc-sec) vs. TEMPERATURE AT VARIOUS STRAIN AMPLITUDES (UNDER AVERAGE STRESS OF 3.0 LBS.)

| Temperature °C. | STRAIN AMPLITUDES | | | |
|---|---|---|---|---|
|  | 2% | 4% | 6% | 8% |
| 70 | 1.41×10⁵ | 5.64×10⁵ | 12.69×10⁵ | 22.60×10⁵ |
| 80 | 1.23 | 4.92 | 11.07 | 19.70 |
| 90 | 1.15 | 4.60 | 10.35 | 18.40 |
| 100 | 1.08 | 4.32 | 9.72 | 17.30 |
| 110 | 1.01 | 4.04 | 9.09 | 16.20 |
| 120 | 0.95 | 3.80 | 8.55 | 15.20 |
| 130 | 0.87 | 3.48 | 7.83 | 13.92 |

The effective strain amplitudes $\epsilon$ and corrected heat generation rates $Q$ per unit volume of the cords were determined taking intervals of thickness through the reinforced zone as $\Delta x_m = 0.025$ cm. and through the outer rubber layer as $\Delta x_r = 0.031$ cm.; and by iteration on the computer, fitting the calculated sidewall surface temperatures, $T_N$, to the measured sidewall surface temperatures, $T_S$, for Tire I at the equilibrium states. These effective strain amplitudes at the successive loads applied, and the experimental sidewall surface temperatures, are shown in Table V below.

TABLE V

EFFECTIVE STRAIN AMPLITUDES IN TIRE I

| Time (hr.) | Load on Tire (lbs.) | Tire Surface Temperature ($T_S$) at Equilibrium State | Effective Strain Amplitudes |
|---|---|---|---|
| 0.4 | 1510 | —* | — |
| 4–10 | 1650 | —* | — |
| 10–34 | 1770 | 81.5 | 0.02955 |
| 34–42 | 1947 | 94.3 | 0.03170 |
| 42–50 | 2142 | 99.4 | 0.03223 |
| 50–58 | 2360 | 105.2 | 0.03276 |
| 58–66 | 2595 | 111.8 | 0.03329 |

*Insufficient data for analysis.

Using the effective strain amplitudes of Table V, the temperature profiles through Tire I, at 10-minute time intervals during the running thereof under load, are determined by the above discussed computer solutions for $Q$ as a function of strain $\epsilon$ and temperature, and for $T_i$ per Step 7. A typical temperature profile thus determined is shown in Table VI below. It will be noted that the calculated sidewall surface temperature, $T_N$, when equilibrium is reached, is 94.4°C., agreeing well with the measured value in Table V of 94.3°C. at this load.

TABLE VI

TYPICAL TEMPERATURE PROFILE IN TIRE I UNDER A LOAD (1947 lbs.) CORRESPONDING TO AN EFFECTIVE STRAIN AMPLITUDE OF 0.03170 = 3.170%

(t is the time from the most recent change of load)

| t min. | x=0 $T_1$ °C. | $T_2$ °C. | $T_3$ °C. | $T_4$ °C. | x=$L_m$=0.1 cm $T_5$ °C. | $T_6$ °C. | $T_7$ °C. | $T_8$ °C. | $T_9$ °C. | $\Delta x_r = 0.031$ cm $T_{10}$ °C. | $T_{11}$ °C. | $T_{12}$ °C. | x=L =0.35 cm. $T_{13}=T_N$ °C. |
|---|---|---|---|---|---|---|---|---|---|---|---|---|---|
| 10 | 134.2 | 133.8 | 132.6 | 130.5 | 127.7 | 123.5 | 119.2 | 115.0 | 110.8 | 106.5 | 102.3 | 98.0 | 93.7 |
| 20 | 135.0 | 134.6 | 133.4 | 131.3 | 128.4 | 124.2 | 119.9 | 115.7 | 111.4 | 107.1 | 102.8 | 98.5 | 94.2 |
| 30 | 135.3 | 134.9 | 133.6 | 131.6 | 128.7 | 124.4 | 120.2 | 115.9 | 111.6 | 107.3 | 103.0 | 98.7 | 94.4 |
| 40 | 135.4 | 135.0 | 133.7 | 131.7 | 128.8 | 124.5 | 120.2 | 116.0 | 111.7 | 107.4 | 103.1 | 98.7 | 94.4 |
| 50 | 135.4 | 135.0 | 133.8 | 131.7 | 128.8 | 124.5 | 120.3 | 116.0 | 111.7 | 107.4 | 103.1 | 98.8 | 94.4 |
| 60 | 135.4 | 135.0 | 133.8 | 131.7 | 128.8 | 124.6 | 120.3 | 116.0 | 111.7 | 107.4 | 103.1 | 98.8 | 94.4 |
| 70 | 135.4 | 135.0 | 133.8 | 131.7 | 128.8 | 124.6 | 120.3 | 116.0 | 111.7 | 107.4 | 103.1 | 98.8 | 94.4 |
| 80 | 135.4 | 135.0 | 133.8 | 131.7 | 128.8 | 124.6 | 120.3 | 116.0 | 111.7 | 107.4 | 103.1 | 98.8 | 94.4 |
| 90 | 135.4 | 135.0 | 133.8 | 131.7 | 128.8 | 124.6 | 120.3 | 116.0 | 111.7 | 107.4 | 103.1 | 98.8 | 94.4 |

Applying these same effective strain amplitudes to the experimental heat generation data of Table III, found in the hysteresis apparatus for the cords of Tires II and III, the methods of Step 7 were employed to predict temperature profiles through the sidewalls of Tires II and III by solving for $T_i$ at successive intervals (i) through the sidewall and at successive time intervals after a change in heat generation rate (due to change in load) as above described. Table VII below shows the sidewall surface temperatures, $T_N$, predicted by this method to be reached at the equilibrium state under the successive loads applied during running of Tires II and III and shows, for comparison, the experimentally determined surface temperatures, $T_s$.

TABLE VII

PREDICTED AND MEASURED TIRE SURFACE TEMPERATURES

| Load on Tire (lbs.) | Time (hr.) | TIRE II Temperature, °C. Predicted $T_N$ | TIRE II Measured $T_s$ | TIRE III Temperature, °C. Predicted $T_N$ | TIRE III Measured $T_s$ |
|---|---|---|---|---|---|
| 1770 | 34 | 85 | 87 | 92 | 90 |
| 1947 | 42 | 98 | 98 | 107.6 | 108 |
| 2142 | 50 | 103 | 103 | 112.5 | 113 |
| 2360 | 58 | 108 | 108 | 117.5 | 118 |

The omission of the adjustment for rubber hysteresis (3% strain) in the above calculations was found to affect the prediction of sidewall temperature determination by no more than about 1°C. In the calculation, the omission is largely compensated by a slightly higher value for Effective Strain Amplitude, higher by a factor of about 1.01 – 1.02 (0.03 – 0.05% length increase).

"Strain Amplitude" throughout this specification designates the maximum fractional or percentage elongation applied to a strand based on its length when incorporated in the tire, under no load and inflated to the pressure used in the tire testing experiments, viz., 24 p.s.i.g. Referred to the hysteresis tests, strain amplitude is one-half the fractional or percentage change in length of the strand between the position of minimum stress and the position of maximum stress applied by the motion of the eccentric member supporting one end of the strand.

Further refinements can be made in the above procedures; for example, the actual temperature of a strand in the oven of the hysteresis apparatus is somewhat higher than that recorded by the termocouples, and can be corrected upward to allow for heat loss from the strand to the surrounding air. Such correction can be calculated as: $\Delta T = QR/2h$, where $Q$ is the rate of heat generation in the strand per unit volume; $R$ is the radius of the strand; and $h$ is the convective heat transfer coefficient from a horizontal cylinder into air. Typically, $\Delta T$ is about 15°C.

As another refinement, the average stress applied to the cords in the hysteresis test can be adjusted at the various temperatures of testing to reflect increase in inflation pressure of a tire with increasing tire temperatures.

However, it will be recognized that such refinements are not necessary for practical purposes because their effects are relatively small and are largely compensated by the procedure of this invention for obtaining "corrected" heat generation rates and "effective" strain amplitudes.

We claim:
1. Non-destructive method of determining temperature profile through the sidewall of an inflated pneumatic tire running under load, which method comprises:
   1. determining, for an inflated tire, the stress on the cords in the reinforced region of the sidewall when under no load;
   2. determining, in the given tire sidewall, the following physical properties:
      specific heat, cord ($C_c$)
      specific heat, rubber ($C_r$)
      density cord ($D_c$)
      density rubber ($D_r$)
      surface heat transfer coefficient from rubber to air ($h$)
      thermal conductivity, cord ($K_c$)
      thermal conductivity, rubber ($K_r$);
   3. determining, in the given tire sidewall, the following parameters of construction:
      thickness of the reinforced region ($L_m$)
      thickness of the outer rubber layer ($L_r$)
      volume fraction of cord in the reinforced region ($V$);
   4. running such tire at constant rate of revolution while maintaining given ambient temperature and under at least one given load;
   5. while so running the tire, measuring the surface temperatures at the sidewall after each new load is imposed, until the surface temperature reaches an equilibrium value;
   6. determining values at various temperatures for rate of heat generation $Q$ per unit volume of cords, by subjecting cords representative of those in said sidewall to hysteresis measurements at average stress maintained equal to that determined under no load per step 1 above; and at cycling rate equal to the rate of revolution imposed on the tire in step 4 above; and at a series of temperatures; and at various strain amplitudes; and measuring the area of the observed hysteresis loop to evaluate heat generation rate at various temperatures and at various strain amplitudes and given cycling rate;
   7. solving by computer the relation below for temperature $T$ at successive times $t$ and at successive points $x$ through the tire sidewall from the inside, through the reinforced region, through the outer rubber layer, to the outside at the surface point where surface temperature $T_s$ was measured, viz.:
   $$DC\,(\delta T/\delta t) = K\,(\delta^2 T/\delta x^2) + QV,$$
   the symbols having the meanings shown in step 2, step 3 and step 6 above, $D$ being the density and $C$ the specific heat of cord or of rubber as appropriate; and the initial conditions being taken at all points $x$ as:
   $T(x,o) = T_a$ (the ambient temperature);
   and the boundary conditions being taken as: at $x = 0$, $\delta T/\delta x = o$, where $x = o$ is at the inner boundary of the reinforced region; and at $x = L_m$, $K_m(\delta T/\delta x) = K_r (\delta T/\delta x)$, where ($L_m$) is at the outer boundary of the reinforced region and ($K_m$) is thermal conductivity of the reinforced region, and $K_m = K_c\,V + K_r\,(1-V)$; and at $x = L$, $-K_r\,(\delta T/\delta x) = h\,(T-T_a)$, where (L) is at the outer surface of the sidewall; and

8. correcting the values used for $Q$ to arrive at a match between the calculated and the experimentally determined values of tire temperatures; whereupon the resulting values of $T$ at the successive points $x$ within the sidewall and at successive times represent the temperature profile through the sidewall at each time.

2. Method of claim 1 wherein rubber hysteresis is allowed for by adding terms to $Q$ found experimentally by the procedure of Step 6 upon rubber representative of that in the tire.

3. Method of claim 1 wherein the experimental values of $Q$ are expressed as a function of strain amplitude at various temperatures, and the corrected values of $Q$ are determined by finding the value for strain amplitude in the functional expression for $Q$, such that the values of the function $Q$ thereof, at the calculated temperatures through the sidewall, produce a match between calculated temperature and measured temperature at the outer surface of the sidewall, whereby the temperature profile through the sidewall is given by using in Step 7 the said values of $Q$, and the effective strain amplitude in the sidewall of the tire running under the load is that value which gives said temperature match.

4. Method for estimating, from measurements on tire cord, temperatures through the sidewall of an inflated pneumatic tire, of known construction, running under load, comprising: determining by the method of claim 3 an effective strain amplitude corresponding to a satisfactory corrected value of $Q$ in a standard tire of the given construction; then utilizing said effective strain amplitude in the procedure of claim 1, Step 6, to determine values, at the temperatures found in the standard tire, for rate of heat generation in the sidewall of the untested tire upon cord representative of those in said sidewall; and solving by computer the relation set forth in claim 1, Step 7, whereupon the resulting value of $T$ at a given time and at any point $x$ within the sidewall provides an estimate of the temperature to be expected at that time and at that point under the given conditions of inflation pressure, load, and rate of revolution of the tire.

* * * * *